M. CORRINGTON.
FLUID PRESSURE BRAKE APPARATUS.
APPLICATION FILED APR. 13, 1911.
1,037,445.
Patented Sept. 3, 1912.
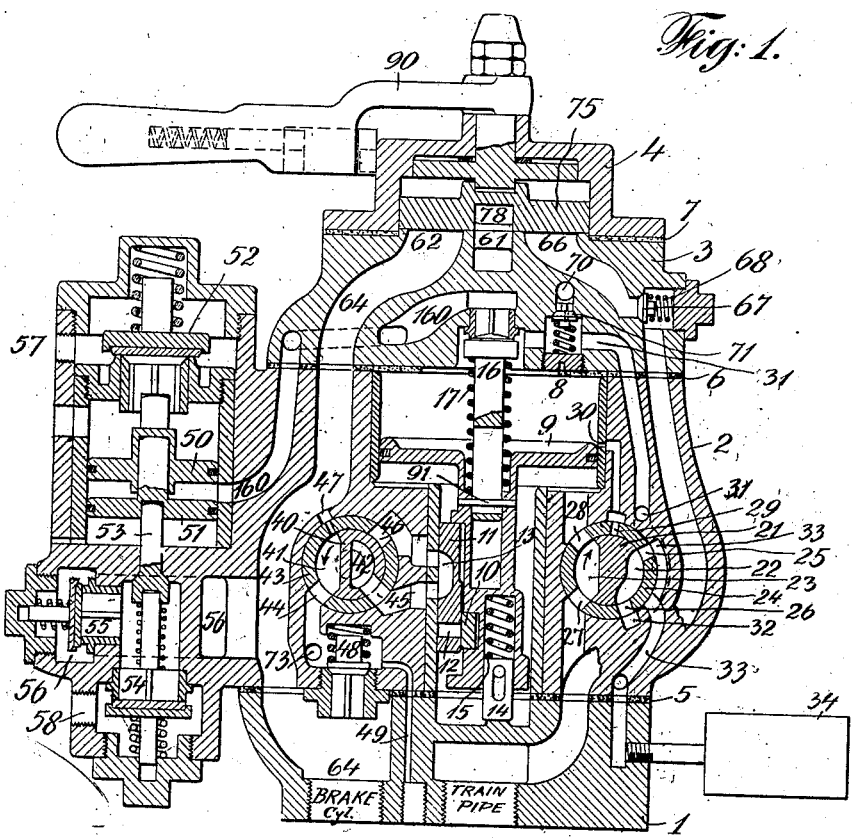

UNITED STATES PATENT OFFICE.

MURRAY CORRINGTON, OF NEW YORK, N. Y., ASSIGNOR, BY MESNE ASSIGNMENTS, TO THE WESTINGHOUSE AIR BRAKE COMPANY, OF PITTSBURGH, PENNSYLVANIA, A CORPORATION OF PENNSYLVANIA.

FLUID-PRESSURE-BRAKE APPARATUS.

1,037,445.  Specification of Letters Patent.  Patented Sept. 3, 1912.

Application filed April 13, 1911. Serial No. 620,893.

*To all whom it may concern:*

Be it known that I, MURRAY CORRINGTON, a citizen of the United States, residing at New York, in the county of New York and State of New York, have invented new and useful Improvements in Fluid-Pressure-Brake Apparatus, of which the following is a specification.

My invention consists of improvements in fluid pressure brake apparatus and more particularly in the necessary valve mechanisms to be located in the engineer's cab for controlling the brake operations on engine, tender and cars, and by means of which simplification and consolidation of parts and certain improved results are effected.

Referring to the drawings, Figure 1 is a vertical section, substantially on the line x—x of Fig. 2, through a valve mechanism illustrating the main features of my invention, which mechanism, as shown, consists of four sections bolted together with appropriate intervening gaskets; Fig. 2, is a plan of the rotary valve seat section 3 of Fig. 1; Fig. 3, is a plan of the rotary valve which operates on said seat; and Fig. 4, is a section of a valve device to be preferably employed in connection with the apparatus of Fig. 1.

Referring to Fig. 1, the valve mechanism consists of section 1 forming a base, a main section 2 in which are located the principal moving parts of the apparatus, a rotary valve seat section 3, and an upper cap section 4, these parts being held together by appropriate bolts with gaskets 5, 6 and 7 interposed, after the usual manner. The main section 2 contains a piston chamber 8 in which a piston 9 operates and which controls the movements of valves 10 and 11, the valve 10 moving with the piston while the valve 11 has a lost motion. The arrangement and movements of piston 9 and valves 10 and 11 with port 12 and cavity 13 in the latter are substantially like those of a plain triple valve. The piston 9 is held in the position shown by the stop 14 and spring 15, and it also operates the valve 16 which is normally seated by the light spring 17, when the piston moves downward from its normal position shown in the drawing. Said casing section also includes a cock 21 having cavities 22 and 23 in the key, and operating in a bushing 24 through which are the ports 25, 26, 27, 28, and 29. In the position shown in Fig. 1 the automatic train pipe is normally connected with the underside of piston 9 through ports 27, 23 and 28, the port 29 is closed, but it communicates with the upper side of piston 9 through the port 30 in the piston bushing. A passage 31 leads from the piston chamber 8 above piston 9 to the bushing 24, thence around said bushing, shown in dotted lines, to the port 32 and communicates thence through ports 26, 22, 25, and passage 33 with the reservoir or chamber 34. A second cock 40 is located in the casing section 2 having ports 41 and 42, the latter leading to the atmosphere through the center thereof, and this key operates in a bushing 43 which has ports 44, 45, 46, and also 47, if desired. At the left hand side of said section in a vertical chamber are two pistons 50 and 51 the former for operating the valve 52 and the latter for operating the valves 53 and 54 (in connection with check valve 55), for purposes presently to be explained. Said valves are normally seated by appropriate springs. Port 57 is for connection with the train pipe and port 58 is for connection with a source of pressure supply, such as a main or other reservoir.

Fig. 2 is a plan of casing section 3 and the rotary valve seat 60 having port 61 in the center leading to the atmosphere, port 62 leading by passage 64 (Fig. 1) to the engine and tender brake cylinders, port 63 communicating with passage 62—64 through a reducing valve 631 and passage 632, as illustrated in dotted lines, a large port 65 leading to the automatic train pipe, feed port 66 leading also to the train pipe through a reducing valve device 67—68 (Fig. 1), ports 69 and 70 leading to the top of piston chamber 8, in the latter of which a lightly seated check valve 71 with a port through it may be inserted, as shown, if desired, and also a port 72 leading down through the casing to the chamber above the check valve 48, as shown at 73 (Fig. 1), whence it communicates by a passage 49 with piston chamber 81 of the apparatus shown in Fig. 4, as presently explained.

Fig. 3, is a plan of the rotary valve 75 which operates on the seat of Fig. 2 and has a port 76 through it, a channel or cavity 77 on its under face, and an exhaust cavity 78, which consists of a circular port in the center and a nearly V shaped port at its outer edge on the surface of the valve with a passage cored through the body of the valve connecting these two ports on the valve face, as shown in dotted lines.

Fig. 4 consists of suitable casing sections having a piston chamber 81 and piston 82 therein adapted to operate a supply valve 83 for admitting pressure from a supply connection 86 to the engine and tender brake cylinders through port 87. The chamber 81 above piston 82 is connected by any suitable means with the passages 49 and 73 of Fig. 1.

The operation of the apparatus and the control of the brakes on engine, tender and cars will now be readily understood, assuming that the cars are equipped with the regular automatic brake apparatus operated by means of triple valves.

Pressure from the main reservoir enters the valve mechanism in any suitable manner, not necessary to be shown, and is present in the chamber above the rotary valve 75, and all the movements of said valve are controlled by the engineer through the operation of the handle 90, the movements of which are best understood by reference to Figs. 2 and 3. The rotary valve 75 of Fig. 3 is to be placed on the valve seat 60 of Fig. 2 with the line marked "handle" standing on the line No. 1 of Fig. 2, where there are observed eight radiating lines to indicate the several positions Nos. 1 to 8, inclusive, into which said valve handle is to be moved. In position No. 1 port 76 in the valve stands over port 65 in the valve seat through which main reservoir pressure flows into the train pipe and moves all the triple valves on the cars to release position and charges their auxiliary reservoirs. A corner of port 76 also opens a portion of port 70 and charges pressure into chamber 8 (Fig. 1) above piston 9 and also through ports 31, 32, 26, 22, 25, and 33 into the chamber or reservoir 34. All brakes being released, the brake valve handle is moved to the position No. 3, the normal position while running, when the port 76 stands over feed port 66, and pressure still flows to the train pipe but through the reducing valve device 67—68, (Fig. 1), the valve 67 and spring 68 being intended merely to indicate any suitable pressure reducing valve device for maintaining a reduced pressure in the train pipe. In position No. 3 cavity 77 in the valve keeps train pipe port 65 in communication with port 70, so that the piston 9 is kept between equalized pressures. When the engineer desires to apply the brakes on engine and tender only, he moves the valve handle to position No. 5, when port 76 in the valve stands over port 63 and admits pressure through the reducing device 631 and thence by dotted line 632 and 64 to the brake cylinders. When the brakes are applied with the desired force, he moves the valve handle to position No. 6, lapping all ports. When he wishes to apply brakes on the cars, he moves the valve handle to position No. 7 in which the cavity 78 opens the port 69 to the atmosphere. This reduces the pressure in the reservoir 34 and chamber 8 above piston 9, causing said piston to move upward (compressing the light spring 17), first opening port 12 in valve 11, and then causing said port to register with port 45, and 42 leading to the atmosphere, through which pressure from the train pipe and from the underside of piston 9 flows to the atmosphere until the pressure below said piston falls slightly below the pressure above said piston when the piston moves downward and the valve 10 closes port 12. This operation of the piston 9 and valves 10 and 11 is like that of a triple valve excepting that train pipe air is vented to the atmosphere, and brakes are applied on the cars. The engineer by moving the valve handle between the positions No. 7 and No. 6 controls the amount of reduction of pressure from the reservoir 34 and the chamber above piston 9 in the same manner that he controls the reductions of pressure in the equalizing reservoir and piston chamber with standard automatic brake valves, and the piston 9 and its valves operate essentially as an equalizing piston and valve. In the emergency application the engineer moves the valve handle to position No. 8, when the cavity 78 in the valve connects train pipe port 65 directly with exhaust port 61, thus effecting the emergency operation of the triples on the cars in the usual manner. To effect the release of the engine and tender brakes the engineer moves the valve handle to position No. 4, when the cavity 78 in the valve connects brake cylinder port 62 with exhaust port 61. When the valve handle is turned to position No. 2, port 76 in the valve stands over feed port 66, and cavity 77 connects ports 65 and 70. In positions No. 3 and No. 4 the exhaust cavity 78 in the valve connects the port 72, and hence piston chamber 81 of Fig. 4, (through passages 73, 49) with the atmosphere, while, in position No. 2, the port 72 is closed. If the small port, 47, be employed, the same provides for an equalization of pressures between the chamber, 81, and the engine brake cylinder at all times when the cock, 40, is in the normal position shown in the drawing, and in position No. 4 of the brake valve, this port, 47, would also establish a communication from the chamber, 81, and port, 49, to the port, 62, and through cavity, 78, in the rotary valve, to the exhaust port, 61, and the atmosphere. So long as the valve mechanism herein illustrated and described is operating on the engine on which the engineer is controlling the brake operations, he applies and releases the engine and tender brakes by what are equivalent to straight-air operations in all ordinary operations, and he operates the car brakes by the usual automatic operations. If he desires to apply engine and car brakes in service at the same time he moves the valve handle to position No. 7 until the pressure above piston 9 is sufficiently reduced and then moves the handle to position No. 5 instead of No. 6, so that all brakes are being applied together.

Position No. 6 is a lap position both for automatic and straight-air operations when the automatic brakes are applied on the cars. When it is desired to apply on the engine and tender only and keep the train pipe charged and brakes released on the cars, the brake valve handle is turned to position No. 5 long enough to admit the desired pressure to the brake cylinder, and then to position No. 2, which may be termed a straight air lap position, in which all exhaust outlets from the brake cylinder are closed while air under pressure is fed to the train pipe through ports 76 and 66. In the emergency operation, whether caused by moving the brake valve handle to position No. 8 or by the rupture of the train pipe, the sudden reduction of pressure on the lower side of piston 9 caused the pressure above said piston to move the same downward and by means of the pin 91 to open the valve 16 and admit pressure through passage 160 into the chamber between pistons 50 and 51. The piston 50 moves upward unseating valve 52 and venting pressure from the train pipe through port 57 and said valve to the atmosphere, and the piston 51 moves downward unseating valve 54 and admitting pressure from the supply passage 58 past said valve, through the check valve 55, and thence by passage 56 to the brake cylinder passage 64.

When the engine equipped with this apparatus is to be employed as the second engine in double heading, the brake valve handle is turned to lap position, lapping all ports. The cock 21 is given a quarter turn to the right, as indicated by the arrow, so that cavity 23 therein connects ports 28, 29 and 25 in the bushing, and cavity 22 connects ports 26 and 27. The cock 40 is given a quarter turn to the left, as indicated by the arrow, so that cavity 41 therein connects ports 44 and 45 in the bushing, port 47 is closed and ports 42 and 46 are placed in communication. When the engineer on the forward engine charges the brake system on the cars, the train pipe pressure flows into the apparatus of Fig. 1 and through ports and passages 27, 22, 26, 32, 31 into piston chamber 8 moving said piston and its valves into the position shown, and flows thence through ports and passages 30, 29, 23 and 28 to the underside of piston 9, and also through 25 and 33, into chamber or reservoir 34, charging the same with pressure equal to that in the train pipe. When the train pipe pressure is reduced to apply brakes, the piston 9 moves upward above port 30, opening port 12 in valve 11 and causing said port to register with the port 45. Pressure from chamber 34 then flows through ports and passages 33, 25, 23, 28, port 12 in valve 11 and ports 45, 41, 44 and 49 into piston chamber 81 (Fig. 4), moving the piston 82 downward, opening valve 83 and admitting pressure from the supply passage 86 through port 87 to the engine and tender brake cylinders. Pressure then flows through port 86 valve 83 and port 87 until the pressure in the brake cylinders and on the lower side of piston 82 is substantially that on the upper side of said piston, when springs 84 and 85 close the valve 83 and prevent further flow of pressure. The spring 85 may be omitted. The size of chamber 81 has substantially the same relation to that of chamber 34 that a brake cylinder has to an auxiliary reservoir. When the engineer on the forward engine recharges pressure into the train pipe such pressure flows through the channels already indicated to the upper side of piston 9, moving it to the position shown when pressure from the chamber 81 (Fig. 4) is released through passage 49 and pressure in the brake cylinders is released through the check valve 48, and thence by ports and passages 44, 41, 45, 13, 46 and 42. It will be observed that by turning the two cocks 21 and 40, as indicated, the apparatus is converted substantially into a plain triple valve and operates in a manner similar thereto.

I claim:

1. In a fluid pressure brake apparatus, the combination of an engineer's brake valve, a train pipe, a reservoir, a piston operating a main valve and a graduating valve, and means for converting said reservoir from an equalizing to an auxiliary reservoir, and vice versa, and for converting said piston and valves from an equalizing discharge apparatus to a triple valve apparatus, and vice versa.

2. In a fluid pressure brake apparatus, the combination of a piston in a chamber, a train pipe communicating with one side of said piston, a reservoir communicating with the other side thereof, means for alternating the two pressures from the train pipe and from said reservoir so that each pressure shall be alternately on either side of said piston, and means for varying the pressure on said piston for operating the same so that said piston may at one time serve the purpose of an equalizing discharge piston for venting the train pipe to the atmosphere and at another time serve the purpose of a triple valve piston for causing application of brakes on an engine.

3. In a fluid pressure brake apparatus, the combination of a piston in a chamber having train pipe pressure on one side and pressure from a reservoir on the other side, means under control of the engineer for varying the pressure on said piston to operate the same, and means for reversing the pressures on said piston so that the pressure from the train pipe shall be on that side formerly having the pressure from said reservoir, and vice versa.

4. In a fluid pressure brake apparatus, the combination with a main reservoir, train pipe and brake cylinder, of an equalizing piston and discharge valve for controlling the train pipe discharge in service applications, and means controlled by the movement of said piston under a sudden reduction in train pipe pressure for supplying fluid from the main reservoir to the brake cylinder.

5. In a fluid pressure brake apparatus, the combination with a main reservoir, train pipe and brake cylinder, of a piston subject on one side to train pipe pressure, means operated through the movement of the piston in one direction for controlling the train pipe discharge in service applications, and means operated through the movement of the piston in the opposite direction for supplying fluid from the main reservoir to the brake cylinder.

6. In a fluid pressure brake apparatus, the combination with a main reservoir, train pipe and brake cylinder, of a piston subject on one side to train pipe pressure, means operated through the movement of the piston in one direction for controlling the train pipe discharge in service applications, and means operated through the movement of the piston in the opposite direction for supplying fluid from the main reservoir to the brake cylinder, and means capable of control by the engineer for varying the pressure on said piston, and for supplying fluid to the brake cylinder independently of the movement of said piston.

7. In a fluid pressure brake apparatus, the combination with a main reservoir, train pipe and brake cylinder, of an equalizing piston and discharge valve for controlling the train pipe discharge in service applications, means for converting said equalizing discharge valve into a triple valve device, and another piston and valve controlled by pressure from said triple for supplying fluid from the main reservoir to the brake cylinder.

MURRAY CORRINGTON.

Witnesses:
M. LAWSON DYER,
A. S. FOWLER.